US012665371B2

(12) United States Patent
Di Teodoro

(10) Patent No.: US 12,665,371 B2
(45) Date of Patent: Jun. 23, 2026

(54) ARCHITECTURE FOR HIGH-EXTINCTION ELECTRO-OPTIC MODULATION IN PULSED FIBER LASERS

(71) Applicant: Raytheon Company, Tewksbury, MA (US)

(72) Inventor: Fabio Di Teodoro, Hacienda Heights, CA (US)

(73) Assignee: Raytheon Company, Arlington, VA (US)

( * ) Notice: Subject to any disclaimer, the term of this patent is extended or adjusted under 35 U.S.C. 154(b) by 266 days.

(21) Appl. No.: 18/638,488

(22) Filed: Apr. 17, 2024

(65) Prior Publication Data

US 2025/0329977 A1     Oct. 23, 2025

(51) Int. Cl.
  *H01S 3/00* (2006.01)
  *G02F 1/21* (2006.01)
  *H01S 3/067* (2006.01)
(52) U.S. Cl.
  CPC ............ *H01S 3/0085* (2013.01); *G02F 1/212* (2021.01); *H01S 3/06758* (2013.01)
(58) Field of Classification Search
  CPC .... H01S 3/0085; H01S 3/06758; G02F 1/212; G02F 1/225
  See application file for complete search history.

(56) References Cited

U.S. PATENT DOCUMENTS

| | | | |
|---|---|---|---|
| 2020/0303893 A1* | 9/2020 | Yusim | H01S 3/1305 |
| 2023/0246725 A1* | 8/2023 | Dong | H04B 10/506 |
| | | | 398/83 |
| 2025/0233662 A1* | 7/2025 | Lu | H04J 14/0227 |

OTHER PUBLICATIONS

Hofer et al., "Bias Voltage Control in Pulsed Applications for Mach-Zehnder Electrooptic Intensity Modulators," IEEE Transactions on Control Systems Technology, vol. 25, No. 5, Sep. 2017, 6 pages.

* cited by examiner

*Primary Examiner* — Mariam Qureshi

(57)     ABSTRACT

A spectral combiner is configured to spectrally combine a pulsed signal at a first wavelength and a continuous wave (CW) signal at a second wavelength. A time gate has a signal input configured to receive a first multiplexed input signal from the first WDM, a radio frequency (RF) input configured to receive a RF control signal, a bias input configured to receive a direct current (DC) bias signal, and an output. A spectral decomposer is configured to demultiplex a second multiplexed output signal from the time gate's output into a first demultiplexed signal at the first wavelength and a second demultiplexed signal at the second wavelength. The DC bias signal is based on the second demultiplexed signal.

20 Claims, 4 Drawing Sheets

$$P_{OUT} = \alpha\, T_{EOM}\, P_{IN}$$

$$T_{EOM} = \frac{1}{2}\left[1 + \cos\left(\pi\,\frac{V_{RF} + V_{bias}}{V_{\pi}}\right)\right]$$

$P_{OUT}, P_{IN}$ ............... MZM OUTPUT/INPUT OPTICAL POWER $\alpha$ ............................. MZM INSERTION LOSS $T_{EOM}$ ........................ MZM TRANSFER FUNCTION $V_{RF}$ ............................ SIGNAL VOLTAGE $V_{bias}$ ........................ DC BIAS VOLTAGE $V_{\pi}$ ............................. HALF-WAVE VOLTAGE

ARCHITECTURE FOR HIGH-EXTINCTION ELECTRO-OPTIC MODULATION IN PULSED FIBER LASERS

TECHNICAL FIELD

This disclosure generally relates to optical systems. More specifically, this disclosure relates to an architecture for high-extinction electro-optic modulation in pulsed fiber lasers.

BACKGROUND

Maximizing the pulse contrast of lasers used in laser transmitters may be desirable in various applications, such as light detection and ranging (LiDAR) applications. For example, this can be useful in mono-static LiDAR transceivers and single-photon-LiDAR transceivers. Q-switched lasers have traditionally been used in LiDAR applications since they inherently exhibit high pulse contrast, but Q-switched lasers have several undesirable characteristics. Pulse fiber lasers offer several advantages over Q-switched lasers, but pulse fiber lasers may suffer from poor pulse contrast and, in this case, they would therefore be less suitable for use in LiDAR applications or other applications.

Typical Q-switched lasers cannot generate very short pulses (such as about 1 ns or less) due to excessive cavity length. Q-switched lasers that can generate very short pulses, such as microchip lasers, do not generate high energy, and many stages of amplification are needed since the gain per stage is low. This has a negative impact on size, weight, and power. Furthermore, multi-longitudinal mode operation of Q-switched lasers causes unexpected partial mode-locking, with sudden pulse shortening and possible destruction of optics downstream resulting from excessive peak power.

Pulse fiber lasers offer several advantages over Q-switched lasers. For example, fiber amplifiers have a very high gain and are compact, which has a positive impact on size, weight, and power. Also, external amplitude-modulation of a continuous wave (CW) single-longitudinal mode seed (such as from a distributed feedback (DFB) diode laser) generates arbitrary pulse waveforms, with excellent and stable timing. However, the best modulators, generally considered to be Mach-Zehnder modulators (MZMs), exhibit a best case pulse contrast of about 30 dB. This limits the ability of pulse fiber lasers to be used effectively in LiDAR applications or other applications.

SUMMARY

This disclosure relates to high-extinction electro-optic modulation in pulsed fiber lasers.

In a first embodiment, an apparatus includes a spectral combiner configured to spectrally combine a pulsed signal at a first wavelength and a continuous wave (CW) signal at a second wavelength. The apparatus also includes a time gate having a signal input configured to receive a first multiplexed input signal from the spectral combiner, the first multiplexed input signal including the pulsed signal at the first wavelength and the CW signal at the second wavelength, a radio frequency (RF) input configured to receive a RF control signal, a bias input configured to receive a direct current (DC) bias signal, and an output. The apparatus further includes a spectral decomposer configured to demultiplex a second multiplexed output signal from the output of the time gate into a first demultiplexed signal at the first wavelength and a second demultiplexed signal at the second wavelength. The DC bias signal is based on the second demultiplexed signal.

In a second embodiment, a system includes a pulsed signal source configured to operate at a first wavelength, a CW signal source configured to operate at a second wavelength, and a plurality of amplifier stages including an input amplifier stage and an output amplifier stage. Each amplifier stage of the plurality of amplifier stages includes a fiber amplifier, a first WDM configured to spectrally combine a first signal from the fiber amplifier and a second signal from the CW signal source, a time gate configured to gate a first output signal from the first WDM, a second WDM configured to demultiplex a second output from the time gate into a first demultiplexed signal at the first wavelength and a second demultiplexed signal at the second wavelength, a filter configured to filter the first demultiplexed signal, and a bias control configured to receive the second demultiplexed signal. The fiber amplifier of the input amplifier stage is configured to receive a signal from the pulsed signal source, and the fiber amplifier of the output amplifier stage is configured to receive the filtered first demultiplexed signal from the second WDM of the input amplifier stage.

In a third embodiment, a method includes spectrally combining a pulsed signal at a first wavelength and a CW signal at a second wavelength using a spectral combiner and gating a first spectrally combined input from the spectral combiner using a time gate. The gating is controlled by an RF control signal input into an RF input of the time gate. The method also includes demultiplexing a second multiplexed output of the time gate into a first demultiplexed signal at the first wavelength and a second demultiplexed signal at the second wavelength. The method further includes biasing the time gate via a DC output of a bias control, where the DC output of the bias control is adjusted based on the second demultiplexed signal.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
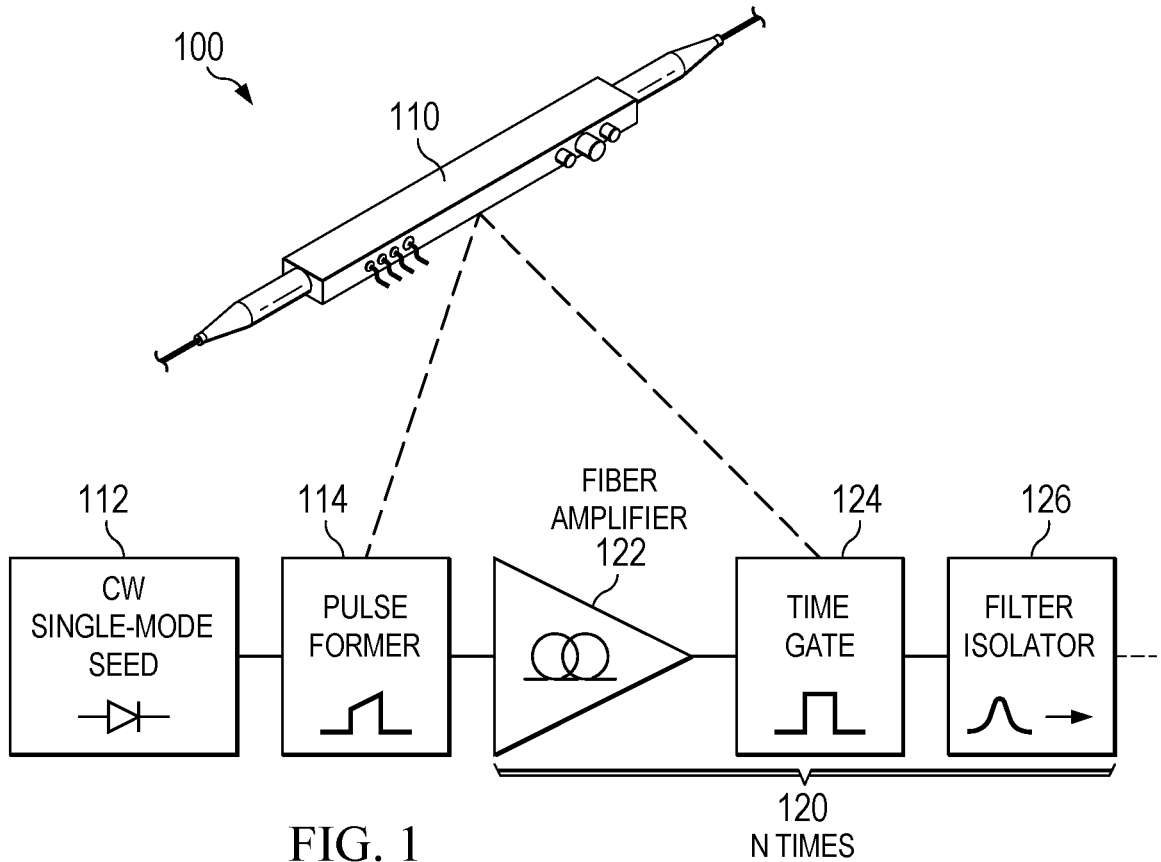
FIG. 1 illustrates an example system supporting high-extinction electro-optic modulation in pulsed fiber lasers in accordance with this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, advanced LiDAR and remote sensing applications strongly benefit from the use of pulsed fiber lasers (PFLs) as optical transmitters. Desirable features of PFLs include reliability, compact packaging, and ruggedness, which facilitate deployment in harsh environments and on platforms subject to severe thermo-mechanical stress. PFLs are built as chains of fusion-spliced fiber-coupled components and resemble electronic circuits rather than traditional lasers featuring free-space bulk optics subject to misalignment. Fibers can be tightly coiled or laid out in a free-form manner to fit in small spaces or occupy odd-shaped enclosures. In addition, PFLs are electro-optically efficient, thermally manageable, and naturally prone to emitting a beam of good spatial quality via controlled optical wave-guidance.

A known detriment related to PFLs is the relatively low optical-pulse contrast (hereafter referred to as "on/off contrast", or OOC) defined as the energy ratio between pulse and unwanted inter-pulse emission. Applications that suffer from insufficient OOC include single-photon-counting LiDAR implementing receivers such as Geiger-mode cameras, which could be saturated by inter-pulse emission and become unable to detect faint pulse returns from targets.

The primary reason for the low OOC stems from PFLs for LiDAR and remote sensing applications being typically architected as master-oscillator/power-amplifier (MOPA) systems. In MOPAs, the pulse waveform generation and control are functionally separated from the generation of high optical power. In a typical implementation of this architecture, the master oscillator (MO) is a low-power laser source characterized by excellent spectral quality including single-frequency emission with high suppression of unwanted side longitudinal modes. The MO is typically operated in continuous-wave (CW) to preserve its spectral purity. Pulsed emission is obtained by transmitting the MO output through an external optical-intensity modulator. A high control on all aspects of the generated pulses is obtained by leveraging the many advantageous features of Mach-Zehnder electro-optic intensity modulators (MZMs). MZMs are time-jitter- and frequency-chirp-free, uniquely broadband devices which afford precise shaping of pulse temporal profiles with time resolution less than 25 ps and dynamic control of pulse duration and repetition frequency supporting arbitrary optical waveform generation. In addition, these devices require driving radio-frequency voltage signals of only few-volt amplitude, which makes them compatible with compact and low-power driving electronics well suited to field applications in which size, weight and power consumption are at a premium.

One implementation challenge is that, due to their working principles, MZMs afford only limited OOC, typically about 30 dB. This value is insufficient for single-photon LiDAR applications, which prefer for OOC to exceed 60 dB and 100 dB in some cases depending on the opto-mechanical layout of the transceiver. A remedy to this limitation is to use multiple time-synchronized MZMs in series, distributed at convenient locations along the MOPA architecture in such a way that the OOC can approximately scale in a linear fashion with the number of MZMs used. In such architectures, the first MZM acts in a pulse forming capacity and the following ones are referred to as "time gates". However, this solution needs to contend with the need to control each MZM bias, namely a direct-current (DC) voltage that must be supplied to the MZM to override environment-driven thermo-mechanical fluctuations that introduce random non-common optical path differences in the MZM and may reduce its OOC. In typical laser architectures featuring an MZM, DC-bias-control circuitry based on active detection/correction feedback loops is commonly implemented as an effective, mature, and readily available solution to mitigate the unwanted bias drift. However, ordinary bias-control devices work with MZMs in which the optical input signal is CW, not pulsed. Therefore, they would be compatible with the first pulse-forming MZM but fail to control the bias, hence achieve high OOC, in subsequent MZMs used as time gates.

Previous approaches to this problem fall short of retaining the full performance capability ensured by the series of MZMs described above. In one such approach, acousto-optic or semi-conductor modulators (AOMs and SCMs), which do not need biasing, are used in lieu of the time-gating MZMs. However, AOMs are significantly slower than MZMs and exhibit rise/fall times about 10 ns or longer. In LiDAR or remote-sensing transceivers, shorter pulse durations of about Ins are preferred as they represent an ideal tradeoff between maximizing the transceiver range resolution and not requiring excessive receiver electronic bandwidth. In these transceivers, the use of AOMs as time gates create a greater than 10 ns wide pedestal beneath the about 1 ns pulse, which may trigger signal detection in sensitive receivers and compromise range resolution. SCMs are semi-conductor optical amplifiers operated in "switch" mode and are significantly faster than AOMs. However, SCMs introduce a significant, fast frequency chirp in the intensity-modulated signal, thereby severely hampering applications that need constant intra-pulse optical phase for coherent detection or coherent phasing tasks.

More drastic measures to deal with the OOC problem in MZMs include changing the design of the PFL from a MOPA to a Q-switched laser. In Q-switched lasers, the laser cavity leaks negligible light between pulses because it is optically closed/blocked by the Q-switch, which typically consists of an intra-cavity AOM or electro-optic modulator (e.g., a Pockels cell) or saturable absorber (passive Q-switch) to allow for energy storage in the laser gain medium, and open only for a short time, which may correspond to the pulse duration. In these lasers, the emitted OOC typically corresponds to the on/off extinction of the Q-switch and can easily exceed 50 dB.

However, Q-switched lasers suffer from several drawbacks that make them impractical for many LiDAR and remote sensing applications. Among such drawbacks is the poor control on pulse timing and temporal format. In passively Q-switched lasers, for example, the pulse repetition frequency is usually not electronically controllable, and the pulse-to-pulse time interval may vary stochastically by amounts that far exceed individual-pulse duration. LiDAR and remote sensing require a very precise timing relationship between their laser transmitter and optical receiver, which is often dictated by an electronic system master clock. In fact, laser transmitters with large pulse time-jitter are incompatible with such externally clocked operation and would have to serve themselves as the clock, which complicates the OST optoelectronic design and greatly reduces its operational flexibility. The pulse time jitter can be somewhat reduced in actively (modulator-based) Q-switched lasers, but even in this case the optical pulse format remains constrained. In particular, the longer the laser cavity and higher the pulse repetition frequency (PRF), the longer the pulse width. As Q-switched fiber laser cavities typically are greater than 1 m long, the corresponding pulse width usually exceed 10 ns, which again severely limits the LiDAR/remote-sensing transceiver range resolution and/or optical data-stream bandwidth. Moreover, the Q-switching modulator typically consists of a bulk free-space component capable of withstanding high intra-cavity pulse power/optical intensity and is thus not consistent with rugged all-fiber architectures. Other pulsed lasers architectures such as mode-locked and Q-switched/mode-locked exhibit architectural and/or pulse format features similarly incompatible with the LiDAR/remote-sensing operation.

In the present disclosure, a solution is provided for utilizing MZMs as time gates in PFLs architected as MOPA and providing a high degree of optical-pulse control, as desired by application, while offering high OOC. Embodiments of the disclosed solution can be implemented with commercially available components, including existing MZM bias control circuitry, but enable MZMs to achieve their maximum OOC capability even when their input optical signal is pulsed.

This disclosure also provides an architecture for high-extinction electro-optic modulation in pulsed fiber lasers. As described in more detail below, the pulse contrast of a pulsed fiber laser may be enhanced by utilizing a series of time gates. This process may be referred to as modulator serialization.

FIG. 1 illustrates an example system 100 supporting high-extinction electro-optic modulation in pulsed fiber lasers in accordance with this disclosure. As shown in FIG. 1, the system 100 includes a pulse fiber laser 110 that is being amplified and gated by a plurality of amplifier stages 120. The system 100 may be used with a LiDAR system or any other optical system requiring a high contrast pulsed optical signal.

The pulse fiber laser 110 of system 100 includes a CW single-mode seed 112 and a pulse former 114. For example, CW single-mode seed 112 may be a DFB diode laser, and pulse former 114 may be a Mach-Zehnder modulator (MZM). To enhance the contrast of the output from pulse fiber laser 110, the output is amplified and gated by a plurality amplifier stages 120. Each amplifier stage includes a fiber amplifier 122, a time gate 124, and a filter/isolator 126.

Although FIG. 1 illustrates one example of a system 100 supporting high-extinction electro-optic modulation in pulsed fiber lasers, various changes may be made to FIG. 1. For example, pulse fiber laser 110 may be replaced with a different type of laser offering similar performance characteristics, or certain components such as filter/isolator 126 may be omitted or replaced with alternative components offering similar features.

Figure 2:
FIG. 2 illustrates an example Mach-Zehnder modulator (MZM) in accordance with this disclosure.
Figure 2:
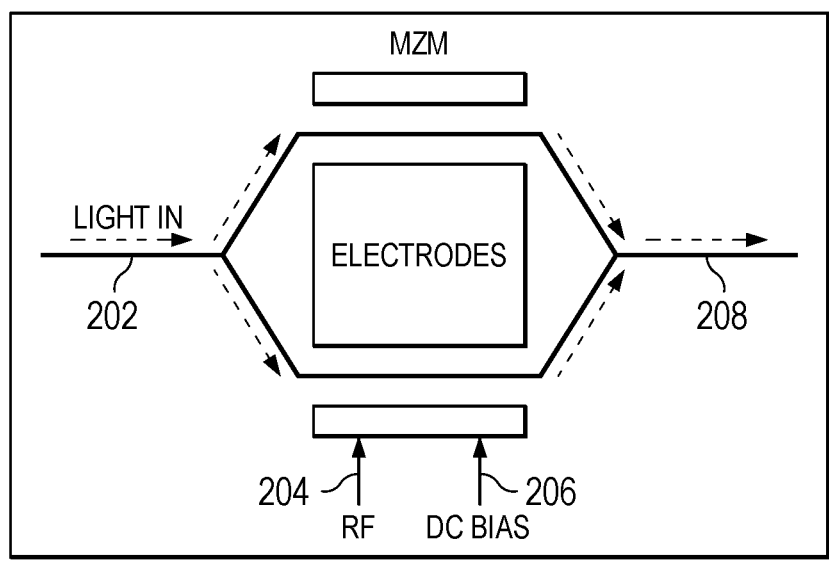

In some embodiments, an MZM is used as a time gate. For example, time gate 124 of FIG. 1 may be implemented using an MZM as shown in FIG. 2. FIG. 2 illustrates an example MZM 200 in accordance with this disclosure. For ease of explanation, the MZM 200 shown in FIG. 2 may be described as being used in the system 100 of FIG. 1, such as to enhance the pulse contrast of pulse fiber laser 110. However, the MZM 200 shown in FIG. 2 may be used in any other suitable environments and for any other suitable purposes.

MZMs work based on non-common path interference. A radio frequency (RF) signal is applied to electrodes of the MZM to differentiate optical paths in twin-lithium niobate waveguides via the photoelectric effect. The created alternating constructive and destructive interference, which gives rise to the desired intensity modulation at the output. A DC bias voltage must also be applied. The bias voltage must be adjusted versus time with a control loop to offset environment drive, parasitic pyroelectric, photorefractive, and photoconductive bias drift. MZMs commonly use feedback.

As shown in FIG. 2, MZM 200 includes a signal input 202, an RF input 204, a bias input 206, and an output 208. RF input 204 is used to modulate a signal input into signal input 202. The modulated signal is output from output 208 in accordance with the signal voltage received at RF input 204. Bias input 206 is used to offset environmental effects as previously discussed. The output of MZM 200 may be determined based on the MZM transfer function which is shown on FIG. 2.

Although FIG. 2 illustrates one example of a MZM 200, various changes may be made to FIG. 2. For example, MZM 200 may be replaced with a different type of modulator offering similar performance characteristics.

MZMs commonly utilize feedback based bias control loops. However, such bias control loops utilize a CW signal through the MZM. In the example of FIG. 1, a CW signal is only available at the input of pulse former 114, but not at the plurality time gates 124. Therefore, to utilize MZMs as time gates 124, a CW source should be provided to time gates 124 to enable feedback based bias control loops. The present disclosure provides an architecture shown in FIG. 3 where a plurality of MZM time gates are able to receive a CW signal for biasing the time gates based on spectral discrimination.

Figure 3:
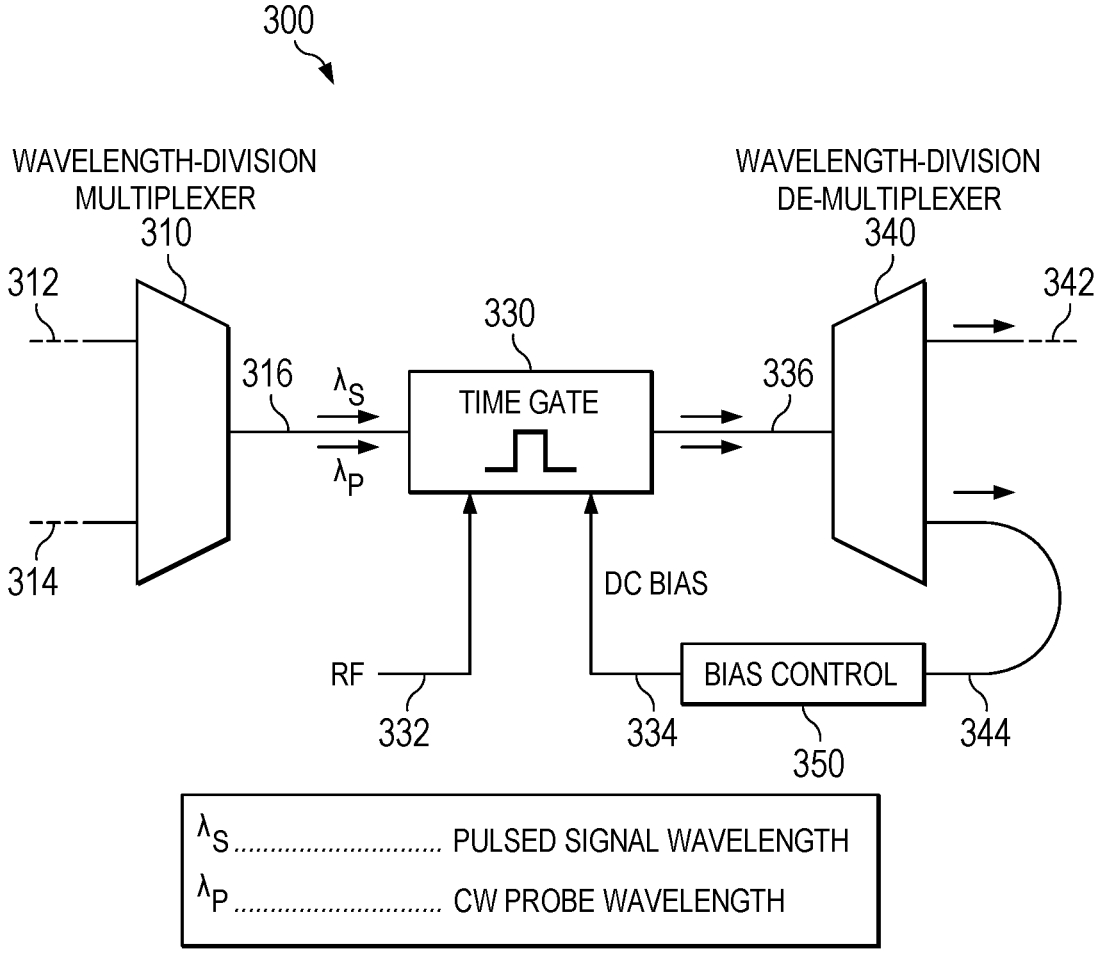
FIG. 3 illustrates an example architecture for biasing an MZM used as a time gate in accordance with this disclosure.

FIG. 3 illustrates an example architecture 300 for biasing an MZM used as a time gate in accordance with this disclosure. For ease of explanation, the architecture 300 shown in FIG. 3 may be described as being used in the system 100 of FIG. 1, such as to enhance the pulse contrast of pulse fiber laser 110. However, the architecture 300 shown in FIG. 3 may be used in any other suitable environments and for any other suitable purposes.

As shown in FIG. 3, the architecture 300 includes a first spectral combiner, e.g., wavelength division multiplexer (WDM) 310. WDM 310 is configured to spectrally combine a pulsed signal 312 at a first wavelength and a CW signal 314 at a second wavelength. For example, pulsed signal 312 may be a pulsed signal from pulse fiber laser 110 of FIG. 1, and CW signal 314 may be a CW signal from an auxiliary source such as a diode laser. CW signal 314 is a probe signal which may be used to control a bias control loop of an MZM. It should be appreciated that while WDM 310 represents one example of a component that may be used for wavelength/spectral combining, any suitable component to achieve wavelength combining of two or more wavelengths may be used. For example, wavelength combining may be performed with a fiber-coupled diffractive grating, a fiber-coupled dichroic filter, etc.

Architecture 300 further includes a time gate 330. Time gate 330 may be an MZM such as MZM 200 of FIG. 2. Time gate 330 is configured to receive an input signal 316 from WDM 310. Input signal 316 is the spectrally combined signal of pulsed signal 312 and CW signal 314. Time gate 330 is further configured to receive an RF control signal 332 and a DC bias signal 334. Based on input signal 316, RF control signal 332, and DC bias signal 334, time gate 330 outputs an output signal 336. Output signal 336 is the modulated signal of input signal 316.

Architecture 300 further includes a spectral decomposer, e.g., a second WDM 340. WDM 340 is configured to demultiplex output signal 336 into a first demultiplexed signal 342 at the first wavelength, and a second demultiplexed signal 344 at the second wavelength. Signal 342 is the modulated signal 312, and signal 344 is the modulated signal 314. Signal 342 continues downstream. For example, signal 342 may be used to feed a different amplifier stage 120 of FIG. 1. It should be appreciated that while the second WDM 340 is used here as an example of a component that may be used for demultiplexing a wavelength multiplexed signal, any suitable component to achieve wavelength demultiplexing into signals at two or more wavelengths may be used. For example, wavelength demultiplexing may be performed with a fiber-coupled diffractive grating, a fiber-coupled dichroic filter, etc.

Architecture 300 further includes a bias control 350. Bias control 350 is configured to received signal 344, and generate RF control signal 332 from a bias control output based on signal 344. This provides bias control to compensate bias drifts and keep time gate 330 balanced.

Although FIG. 3 illustrates one example of an architecture 300 for biasing an MZM used as a time gate, various changes may be made to FIG. 3. For example, time gate 330 may be replaced with a different type of modulator offering similar performance characteristics.

In some embodiments, a wavelength for the probe signal is chosen that is close enough to the wavelength of the pulsed signal so that the MZM half-wave voltage is virtually unchanged, but far enough from the wavelength of the pulsed signal so that it is outside of the fiber amplifier gain bandwidth. Also, in some embodiments, the probe wavelength is filtered so that it negligibly affects pulse contrast.

Figure 4:
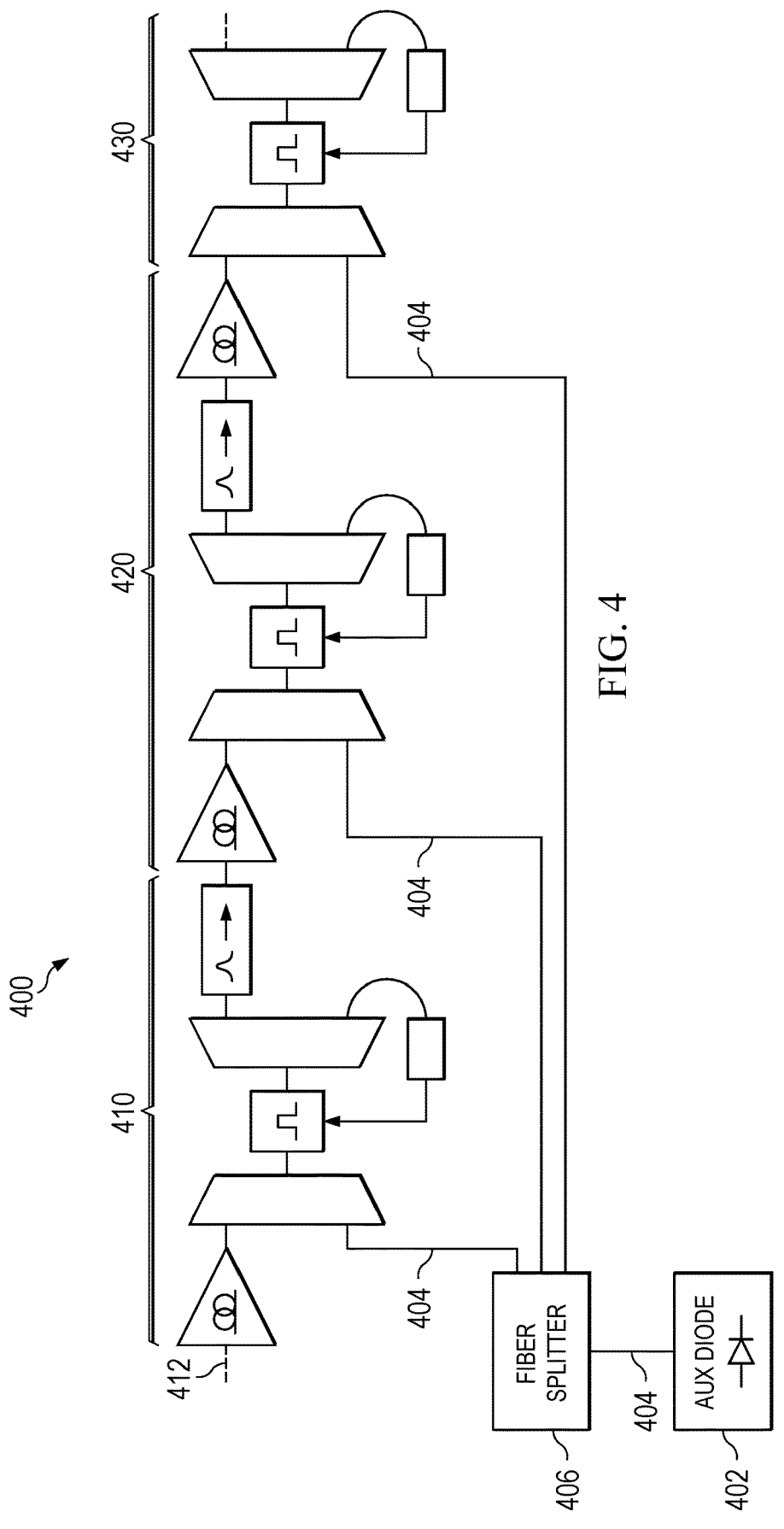
FIG. 4 illustrates another example system supporting high-extinction electro-optic modulation in pulsed fiber lasers in accordance with this disclosure.

As shown in FIG. 1, a plurality amplifier stages may be utilized to provide modulator serialization to enhance the contrast of a pulsed signal. Each amplifier stage may include the architecture described in FIG. 3. FIG. 4 illustrates another example system 400 supporting high-extinction electro-optic modulation in pulsed fiber lasers in accordance with this disclosure. As shown in FIG. 4, system 400 includes an aux diode 402, a fiber splitter 406, and plurality of amplifier stages 410, 420, and 430. Aux diode 402 provides a CW signal 404 which is split by fiber splitter 406. For example, aux diode 402 may be a diode laser. Each of amplifier stages 410, 420, and 430 is similar to an amplifier stage 120 of FIG. 1, including a fiber amplifier and a filter/isolator, and time gate, further including the architecture of FIG. 3. Each of amplifier stages 410, 420, and 430 receive signal 404 from fiber splitter 406. Signal 404 is a probe signal used by amplifier stages 410, 420, and 430 to enable bias control as previously described herein. In the example of FIG. 3, amplifier stage 410 may be considered an input amplifier stage with respect to amplifier stage 420, and amplifier stage 420 may be considered an output amplifier stage with respect to amplifier stage 410. Similarly, amplifier stage 420 may be considered an input amplifier stage with respect to amplifier stage 430, and amplifier stage 430 may be considered an output amplifier stage with respect to amplifier stage 420.

In the example of FIG. 4, amplifier stage 410 receives a pulsed signal 412. For example, pulsed signal 412 may be a signal from a pulse fiber laser such as pulse fiber laser 110 of FIG. 1. Amplifier stage 410 amplifies, gates, and filters signal 412 to enhance the pulse contrast of signal 412. The filtered signal form amplifier stage 410 is then received by amplifier stage 420 where it undergoes a similar process, further enhancing the pulse contrast. Finally, the signal from amplifier stage 420 is received by amplifier stage 430, undergoing a similar process and even further enhancing the pulse contrast of the signal from amplifier stage 420.

Although FIG. 4 illustrates one example system 400 supporting high-extinction electro-optic modulation in pulsed fiber lasers, various changes may be made to FIG. 4. For example, any number of additional amplifier stages may be chained together similar as shown regarding amplifier stages 410, 420, and 430. In another example, fewer amplifier stages may be utilized.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a spectral combiner configured to spectrally combine a pulsed signal at a first wavelength and a continuous wave (CW) signal at a second wavelength;
a time gate comprising:
a signal input configured to receive a first spectrally combined input signal from spectral combiner, the first spectrally combined input signal comprising the pulsed signal at the first wavelength and the CW signal at the second wavelength;
a radio frequency (RF) input configured to receive a RF control signal;
a bias input configured to receive a direct current (DC) bias signal; and
an output; and
a spectral decomposer configured to demultiplex a second multiplexed output signal from the output of the time gate into a first demultiplexed signal at the first wavelength and a second demultiplexed signal at the second wavelength, wherein the DC bias signal is based on the second demultiplexed signal.

2. The apparatus of claim 1, wherein:
the time gate comprises a Mach-Zehnder modulator (MZM);
the spectral combiner comprises a wavelength division multiplexer; and
the spectral decomposer comprises a wavelength division multiplexer.

3. The apparatus of claim 1, further comprising:
a pulse fiber laser configured to generate the pulsed signal; and
a bias control circuit comprising:
a bias control input configured to receive the second demultiplexed signal; and
a bias control output coupled to the bias input of the time gate and configured to output the DC bias signal based on the second demultiplexed signal.

4. The apparatus of claim 3, wherein the pulse fiber laser comprises a CW single-mode seed and a pulse former.

5. The apparatus of claim 1, further comprising:
a fiber amplifier configured to amplify the pulsed signal before the pulsed signal is spectrally combined by the spectral combiner.

6. The apparatus of claim 1, further comprising:
a filter configured to filter the first demultiplexed signal.

7. A system comprising:
a pulsed signal source configured to operate at a first wavelength;
a continuous wave (CW) signal source configured to operate at a second wavelength; and
a plurality of amplifier stages comprising an input amplifier stage and an output amplifier stage, wherein each amplifier stage of the plurality of amplifier stages comprises:
a fiber amplifier;
a first wavelength division multiplexer (WDM) configured to spectrally combine a first signal from the fiber amplifier and a second signal from the CW signal source;
a time gate configured to gate a first output signal from the first WDM;
a second WDM configured to demultiplex a second output from the time gate into a first demultiplexed signal at the first wavelength and a second demultiplexed signal at the second wavelength;
a filter configured to filter the first demultiplexed signal; and
a bias control configured to receive the second demultiplexed signal;
wherein the fiber amplifier of the input amplifier stage is configured to receive a signal from the pulsed signal source, and the fiber amplifier of the output amplifier stage is configured to receive the filtered first demultiplexed signal from the second WDM of the input amplifier stage.

8. The system of claim 7, wherein:
the plurality of amplifier stages comprises an additional amplifier stage; and
the fiber amplifier of the additional amplifier stage is configured to receive the filtered first demultiplexed signal from the second WDM of the output amplifier stage.

9. The system of claim 7, wherein the time gate comprises a Mach-Zehnder modulator (MZM).

10. The system of claim 7, wherein the pulsed signal source is a pulse fiber laser.

11. The system of claim 10, wherein the pulse fiber laser comprises a CW single-mode seed and a pulse former.

12. The system of claim 7, wherein the time gate is configured to gate the first output signal from the first WDM based on a radio frequency (RF) input signal at an RF input of the time gate.

13. The system of claim 7, wherein the time gate is configured to gate the first output signal from the first WDM based on a bias control output of the bias control, the bias control output based on the second demultiplexed signal.

14. The system of claim 7, further comprising:
a fiber splitter configured to split the second signal from the CW signal source;
wherein the first WDM is configured to receive the second signal from the CW signal source via the fiber splitter.

15. A method comprising:
spectrally combining a pulsed signal at a first wavelength and a continuous wave (CW) signal at a second wavelength using a spectral combiner;
gating a first spectrally combined input from the spectral combiner using a time gate, wherein the gating is controlled by a radio frequency (RF) control signal input into an RF input of the time gate;
demultiplexing a second multiplexed output of the time gate into a first demultiplexed signal at the first wavelength and a second demultiplexed signal at the second wavelength; and
biasing the time gate via a direct current (DC) output of a bias control, wherein the DC output of the bias control is adjusted based on the second demultiplexed signal.

16. The method of claim 15, wherein the time gate comprises a Mach-Zehnder modulator (MZM).

17. The method of claim 15, wherein the pulsed signal is generated by a pulse fiber laser.

18. The method of claim 17, wherein:
the pulse fiber laser comprises a CW single-mode seed and a pulse former; and
generating the pulsed signal comprises pulsing the CW single-mode seed.

19. The method of claim 15, further comprising:
amplifying the pulsed signal using a fiber amplifier prior to spectral combining of the pulsed signal by spectral combiner.

20. The method of claim 15, further comprising:
filtering the first demultiplexed signal using a filter.

\* \* \* \* \*